US 6,705,500 B2

(12) United States Patent
Shea et al.

(10) Patent No.: US 6,705,500 B2
(45) Date of Patent: Mar. 16, 2004

(54) METHOD AND SYSTEM FOR POSITIONING GUIDE ARMS IN A STRIP FABRICATION ASSEMBLY

(75) Inventors: Kevin A. Shea, Vancouver, WA (US); Curtis L. Carter, Vancouver, WA (US)

(73) Assignee: H.B. Fuller Licensing & Financing, Inc., St. Paul, MN (US)

( * ) Notice: Subject to any disclaimer, the term of this patent is extended or adjusted under 35 U.S.C. 154(b) by 0 days.

(21) Appl. No.: 10/121,304

(22) Filed: Apr. 12, 2002

(65) Prior Publication Data

US 2002/0170938 A1 Nov. 21, 2002

Related U.S. Application Data

(63) Continuation-in-part of application No. 09/912,914, filed on Jul. 25, 2001.
(60) Provisional application No. 60/285,442, filed on Apr. 19, 2001, and provisional application No. 60/283,490, filed on Apr. 12, 2001.

(51) Int. Cl.[7] .............................................. B65H 20/00
(52) U.S. Cl. ...................................................... 226/179
(58) Field of Search ........................... 226/19, 15, 179; 156/178, 179, 574, 470; 700/18; 242/563.1

(56) References Cited

U.S. PATENT DOCUMENTS

| 4,452,837 A | 6/1984 | Clausen et al. |
| 4,995,937 A | 2/1991 | Persson |
| 5,555,964 A | 9/1996 | Thamphald |
| 5,759,339 A | 6/1998 | Hartman |
| 5,790,168 A | 8/1998 | Sano et al. |

FOREIGN PATENT DOCUMENTS

| EP | 0 347 060 A1 | 12/1989 |
| GB | 2 035 867 A | 6/1980 |
| WO | WO 88/04272 | 6/1988 |
| WO | WO 98/25847 | 6/1998 |

*Primary Examiner*—Emmanuel Marcelo
(74) *Attorney, Agent, or Firm*—Klarquist Sparkman, LLP

(57) ABSTRACT

A method of dispensing a strip product using a strip fabrication assembly, by entering arm positions for guide arms of the assembly into a guide arm controller device, moving the corresponding guide arms of the strip fabrication assembly to the respective arm positions using the guide arm controller device, and feeding different strip materials through the assembly using the guide arms, after moving them to the entered arm positions. The guide arms are coupled to threaded rods, and are moved by actuating servo motors which are coupled to the threaded rods. The guide arm controller device may include a programmable logic controller, which has been programmed to control the servo motors in response to entry of guide arm positions. The controller may further provide for the listing and searching of different sets of previously entered arm positions on a display device of the guide arm controller device, and selection of one of the previously entered sets of arm positions as a current set of arm positions, using an input interface. Multiple sets of arm positions corresponding to different strip product orders can be stored for later use.

27 Claims, 14 Drawing Sheets

METHOD AND SYSTEM FOR POSITIONING GUIDE ARMS IN A STRIP FABRICATION ASSEMBLY

CROSS-REFERENCE TO RELATED APPLICATIONS

The present application claims the benefit of U.S. provisional application Ser. No. 60/285,442 filed Apr. 19, 2001, and Ser. No. 60/283,490 filed Apr. 12, 2001, which are incorporated herein. The present application is a continuation in part of U.S. patent application Ser. No. 09/912,914, filed Jul. 25, 2001, which is incorporated herein.

BACKGROUND

The present invention generally relates to manufacturing processes and process control technology, and more particularly to a method and system for positioning guide members in a mechanical assembly that is used to dispense various strip materials, such as yarns, strings, tapes, webs, and ribbons, where the guide members are positioned by electromechanical servos (servomechanisms) that are managed by a microcontroller having a user interface.

There are many conventional machines and mechanisms for dispensing strip-or string-like materials such as tapes, webs, ribbons and yarns. These machines typically include a series of rollers and supports or plates that are used to bring different layers of the end product together along an assembly path, or to apply other materials, such as adhesives, to one or more surfaces of the substrate strip material.

In this type of machinery, it is usually important to have a relatively precise positioning of the strip materials that are to be integrated, and to properly align any applicators that coat the substrates with other materials. Guide arms or guide members of varying designs are often employed for this purpose. One laminating machine that changes the position of tape guide arms to vary the position of tapes in relationship to the web is shown in U.S. Pat. No. 4,452,837 (Clausen et al.) wherein a plurality of ribbons are fed through a guide member onto a sheet-like web. The guide is a reciprocating bar having eyelets for receiving a plurality of ribbons, and the bar places the ribbons onto the web in a serpentine pattern to provide continuous reinforcement of the substrate in both the machine direction and the transverse direction. The machine uses a ribbon that is pre-coated with a substrate.

U.S. Pat. No. 5,759,339 (Hartman) discloses a machine for adjusting the position of tape dispensing arms between the webs of a laminating machine using a reciprocating belt to change the position of the dispensing arms and a transducer to identify the position of each dispensing arm.

In PCT Application No. WO 88/04272, (Persson) an arrangement is disclosed for applying longitudinally extending tapes to a moving web having a plurality of tape holders and a plurality of tape applicators for guiding the tape into contact with web. The tape applicators are carried by and are capable of being positioned along mutually separate beams of a beam structure that extends transversely to the direction of web travel. The applicators can be adjusted positionally in relation to an applicator-setting beam, which extends transversely to the direction of web movement, and can be locked to this beam in selected positions therealong. The applicator-setting beam is, in turn, carried for longitudinal movement by a stationary carrier beam, which extends parallel with the applicator-setting beam. The applicator-setting beam can also have graduations provided along the length thereof to show the position of the applicators. The applicator-setting beam is moved in relation to the fixed carrier beam by the tape applicators carried thereby, the carriages of the tape applicators being provided to this end with rotatably journalled wheels that support the applicator-setting beam. Longitudinal movement of the applicator-setting beam is effected by means of a threaded spindle that engages a screw-threaded bore in a nut rigidly connected to the applicator-setting beam. The spindle is journalled, but is locked against axial movement in a stationary frame part. The single treaded spindle moves the applicator-setting beam and the tape applicators.

In many of these prior art machines, the position of one or more parts is sensed electronically, and (when the machinery is off-line) a positioning or guide member is moved and adjusted by actuating an electromechanical motor that is coupled to the guide member, i.e., a servo motor or servomechanism. Servomechanisms are used in a wide variety of applications. By using electronic sensors and servos, process controls for these fabrication systems may be automated, at least in part. The sensors and servos may be managed by a microcontroller having a user interface.

Allen-Bradley Co. (Rockwell Automation) sells a line of microcontrollers and related products that may be used for industrial automation. The microcontrollers include the family of small programmable controllers available under the trade designation SLC500. These controllers are one of a type of integrated circuit known generally as a programmable logic controller (PLC). PLCs use a plurality of logic elements and associated interconnect resources that are easily programmed by the end-user to implement user-defined logic operations. They can be programmed using a personal computer (PC) or similar workstation, with appropriate software and a device programmer. Therefore, unlike fully-customized (application-specific) integrated circuits that require a protracted layout procedure and an expensive fabrication process to implement a user's logic operation, a PLC may be utilized to implement the logic operation in a relatively quick and inexpensive manner. Once programmed, these controllers can be operated in conjunction with a user interface (display and keyboard) to automate manufacturing processes in a customized manner.

Unfortunately, these automated process controls have proved inadequate for the manufacture of strip materials. Adjustments of positioning in the machinery, such as tape placement, often require stopping the machinery, i.e., interruption of the actual strip fabrication. There is also a great deal of manual involvement required, such as moving final guides for termination of the strip. It would, therefore, be desirable to devise an improved method of automating the positioning of guide arms for mechanical assemblies used to dispense strip materials. It would be further advantageous if the method could be implemented.

SUMMARY

The foregoing objects are achieved in a method of dispensing a strip product, generally comprising the steps of entering a plurality of arm positions for corresponding guide arms of a strip fabrication assembly into a guide arm controller device (wherein the guide arms align a plurality of moving strip materials), moving the corresponding guide arms of the strip fabrication assembly to the respective arm positions using the guide arm controller device, and feeding a plurality of strip materials through the strip fabrication assembly using the guide arms, after said moving step, to form an integrated strip product. The guide arms may be coupled to a respective one of a plurality of threaded rods, such that the moving step includes the actuation of a plurality of motors, such as servo motors, which are respectively coupled to the threaded rods. The guide arm controller device may include a programmable logic controller, which has been programmed to control the servo motors in response to entry of guide arm positions. The controller may further provide for the listing of a plurality of sets of previously entered arm positions on a display device of the guide arm controller device, and selection of one of the previously entered sets of arm positions as a current set of arm positions, using an input interface of the guide arm controller device. The controller may also search for an order number associated with one of a plurality of sets of previously entered arm positions, and allow the user to select one of the previously entered sets of arm positions as a current set of arm positions. Multiple sets of arm positions corresponding to different strip product orders can be stored for later use.

In one embodiment, the plurality of arm positions is a first plurality of arm positions, and the integrated strip product is a first integrated strip product, and the method further includes the steps of entering a second plurality of arm positions into the guide arm controller device, moving the corresponding guide arms of the strip fabrication assembly to the respective ones of the second plurality of arm positions using the guide arm controller device, and feeding a plurality of strip materials through the strip fabrication assembly using the guide arms, after the moving step, to form a second integrated strip product.

In another embodiment, the guide arm controller device includes a programmable logic controller, and further including the step of programming the controller to allow for the entry and retention of multiple sets of arm positions corresponding to different strip product orders.

In another aspect, the invention features an apparatus for controlling a guide arm system of a strip fabrication assembly, the apparatus including a display device, a user input device, and a microcontroller connected to the display device and the user input device, the microcontroller having means for receiving a plurality of arm positions for corresponding guide arms which are entered into the user input device, and means for transmitting control signals to a plurality of servo motors which are coupled respectively to the guide arms, to thereby move the guide arms based on the plurality of arm positions. In some embodiments, the microcontroller is a programmable logic controller. In other embodiments, the display device and the user input device are a single device.

In one embodiment, the microcontroller further includes means for listing a plurality of sets of previously entered arm positions on the display device, and means for selecting one of the previously entered sets of arm positions as a current set of arm positions in response to the user input device. In other embodiments, the microcontroller further includes means for searching for an order number associated with one of a plurality of sets of previously entered arm positions, and means for selecting one of the previously entered sets of arm positions as a current set of arm positions, using the user input device. In some embodiments, the microcontroller further includes means for allowing the entry and retention of multiple sets of arm positions corresponding to different strip product orders.

In other aspects, the invention features a strip fabrication assembly including a plurality of feed rollers, positioned to integrate strip materials into a strip product, a plurality of guide members located proximate the rollers, the guide members aligning a plurality of the strip materials, and means for controlling the positions of the guide members. In one embodiment, the guide members are tape dispensing arms. In some embodiments, the controlling means includes a programmable logic controller. In other embodiments, the controlling means includes a plurality of motors coupled respectively to the guide members.

In another embodiment, the controlling means receives a plurality of arm positions for corresponding guide arms, and transmits control signals to the motors to thereby move the guide arms based on the plurality of arm positions. In some embodiments, the controlling means lists a plurality of sets of previously entered arm positions on a display device, and selects one of the previously entered sets of arm positions as a current set of arm positions in response to a user input device. In other embodiments, the controlling means searches for an order number associated with one of a plurality of sets of previously entered arm positions, and selects one of the previously entered sets of arm positions as a current set of arm positions in response to a user input device. In one embodiment, the controlling means allows the entry and retention of multiple sets of arm positions corresponding to different strip product orders.

In another aspect, the invention features a computer program product including a computer-readable storage medium, and program instructions stored on the storage medium for controlling a guide arm system of a strip fabrication assembly, including program instructions for receiving a plurality of arm positions for corresponding guide arms, and program instructions for transmitting control signals to a plurality of motors which are coupled respectively to the guide arms, to thereby move the guide arms based on the plurality of arm positions. In some embodiments, the program instructions further provide a listing of a plurality of sets of previously entered arm positions, and allow a user to select one of the previously entered sets of arm positions as a current set of arm positions.

In one embodiment, the program instructions further search for an order number associated with one of a plurality of sets of previously entered arm positions, and allow a user to select one of the previously entered sets of arm positions as a current set of arm positions. In some embodiments, the program instructions further allow the entry and retention of multiple sets of arm positions corresponding to different strip product orders.

In other aspects, the invention features a method of positioning multiple operating units relative to a moving web, the method including: entering a plurality of positions into a controller device, the positions corresponding to a plurality of operating units, moving the operating units to the positions, sensing the position of an edge of a moving web, and, when the position of the edge of the web changes, changing the position of the operating units. In one embodiment, a web tracking unit senses the position of the edge of the moving web, the web tracking unit including a pair of spaced optical sensors for directing light toward a web and receiving reflected light from the web, the sensors being capable of signaling a motor to move the sensors until a desired signal is received from the sensors. In other embodiments, the desired signal from the pair of sensors is a "1" and a "0", the "1" being a reflection from a web, the "0" being no reflection, wherein the motor moves the sensors when the signal from the sensors is the same. In some embodiments, the operating units comprise guide arms.

In another aspect, the invention features an apparatus for controlling a number of operating units, the apparatus including: a user interface, a control system connected to the user interface, the control system including a receiver for receiving a plurality of positions corresponding to a plurality of operating units, the plurality of positions being entered into the control system through the user interface, and a transmitter for transmitting control signals to a plurality of servo motors, which are coupled to the operating units, to thereby move the operating units based on the plurality of positions, and a web tracking unit connected to the control system, the web tracking unit being capable of sensing the position of an edge of a moving web. In one embodiment, the web tracking unit senses a change in the position of the edge of a moving web, the web tracking unit sends a signal to the control system to change the position of the operating units relative to the change in position of the edge of the moving web. In some embodiments, the operating units include guide arms.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
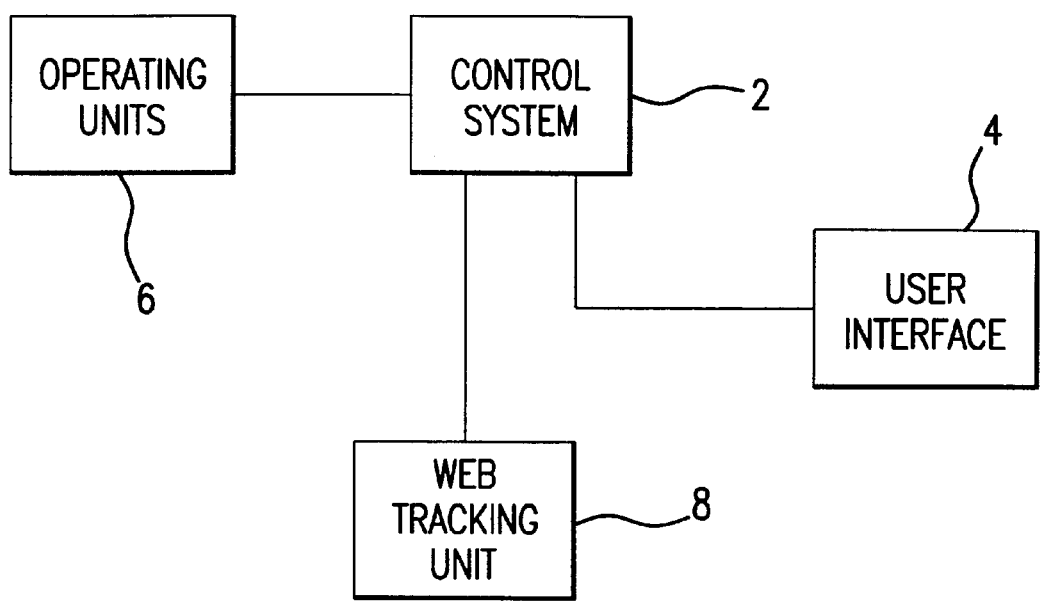
FIG. 1 is a block diagram of an automated system for positioning guide members.

The present invention is directed to a method and system for positioning guide members in a mechanical assembly that is used to dispense a lineal or strip material including, e.g., tape, ribbon, web, string, yarn and combinations thereof. The system includes a control system 2, a user interface 4, an operating unit positioning apparatus 6, and, optionally, a web tracking unit 8, an example of which is illustrated in FIG. 1.

Figure 2:
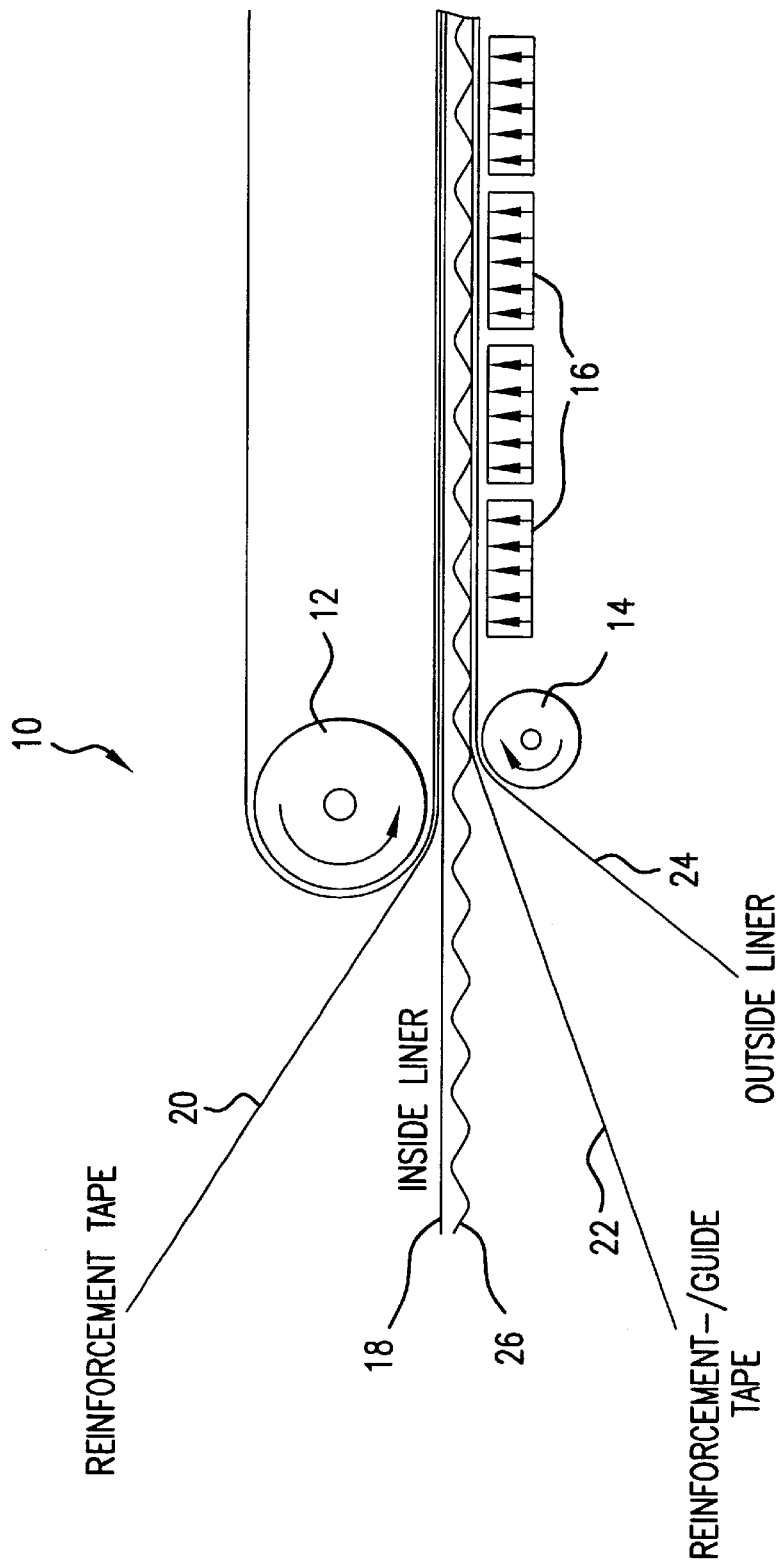
FIG. 2 is a simplified elevational view of an assembly for fabricating strip materials, particularly corrugated sheeting, in accordance with one implementation of the present invention.

The invention may be understood, for example, with reference to an illustrative implementation in the manufacture of corrugated sheeting. With reference now to the figures, and in particular with reference to FIG. 2, there is depicted a simplified elevational view of one embodiment 10 of a tape fabrication assembly constructed in accordance with the present invention. Tape fabrication assembly 10 includes a pair of rollers 12, 14, a series of hot plates 16. An inside liner or substrate layer 18 moves along roller 12, to the right in FIG. 2, and roller 12 applies a reinforcement tape 20 to one side of the inside liner 18 as it moves along. Another reinforcement tape 22 moves along roller 14, also to the right in FIG. 2, and roller 14 applies an outer liner or substrate layer 24 against reinforcement tape 22 as it moves along. These two rollers also capture a corrugated medium 26 between the combined inside layer/tape 18/20 and combined outside layer/tape 24/22. This multi-layer sheeting is then drawn across the hot plates 16 which activate, e.g., a hot-melt adhesive imbedded in the corrugated medium. Examples of hot melt adhesives include an ethylene-vinyl acetate copolymer (EVA-based) hot melt adhesive, EMA-based hot melt adhesive (ethylene methylacrylate), EnBA-based hot melt adhesive (ethylene n-butyl acrylate), hot melt adhesives based on polyamide, polyethylene and polypropylenehomopolymers, copolymers and interpolymers, rubbery block copolymer hot melt adhesives, and remoisentable hot-melt adhesive including, e.g., polyamide-based and copolyester-based adhesives.

Figure 3:
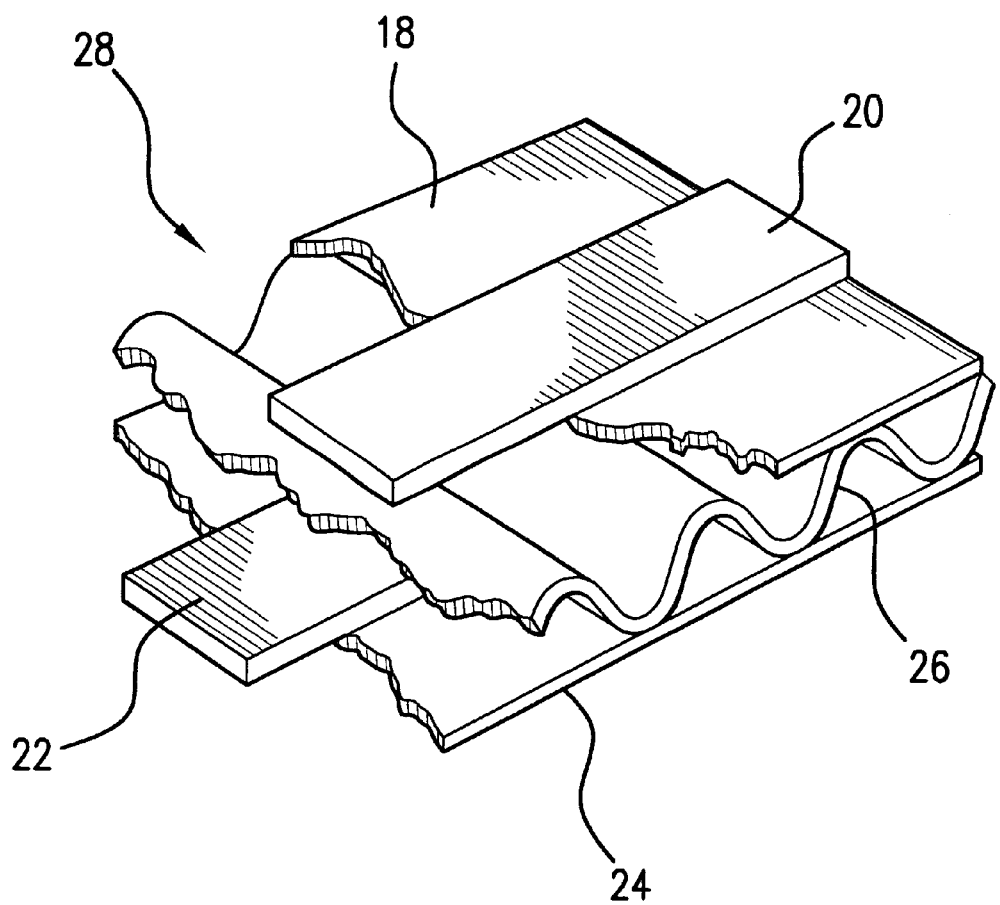
FIG. 3 is a perspective view with a cutout of the corrugated sheeting fabricated by the assembly of FIG. 2.

The result of the process is a strip of corrugated sheeting 28, as illustrated in FIG. 3. This sheeting can be used for many applications, particularly to form boxes used for packaging. Additional details of the corrugating machine may be found in U.S. Pat. No. 5,759,339 and incorporated herein.

The tape fabrication assembly 10 utilizes several tape dispensing guide arms to apply the tapes to the webs. These tape dispensing guide arms are described in detail in U.S. provisional patent application Serial No. 60/283,490 and incorporated herein.

Figure 4:
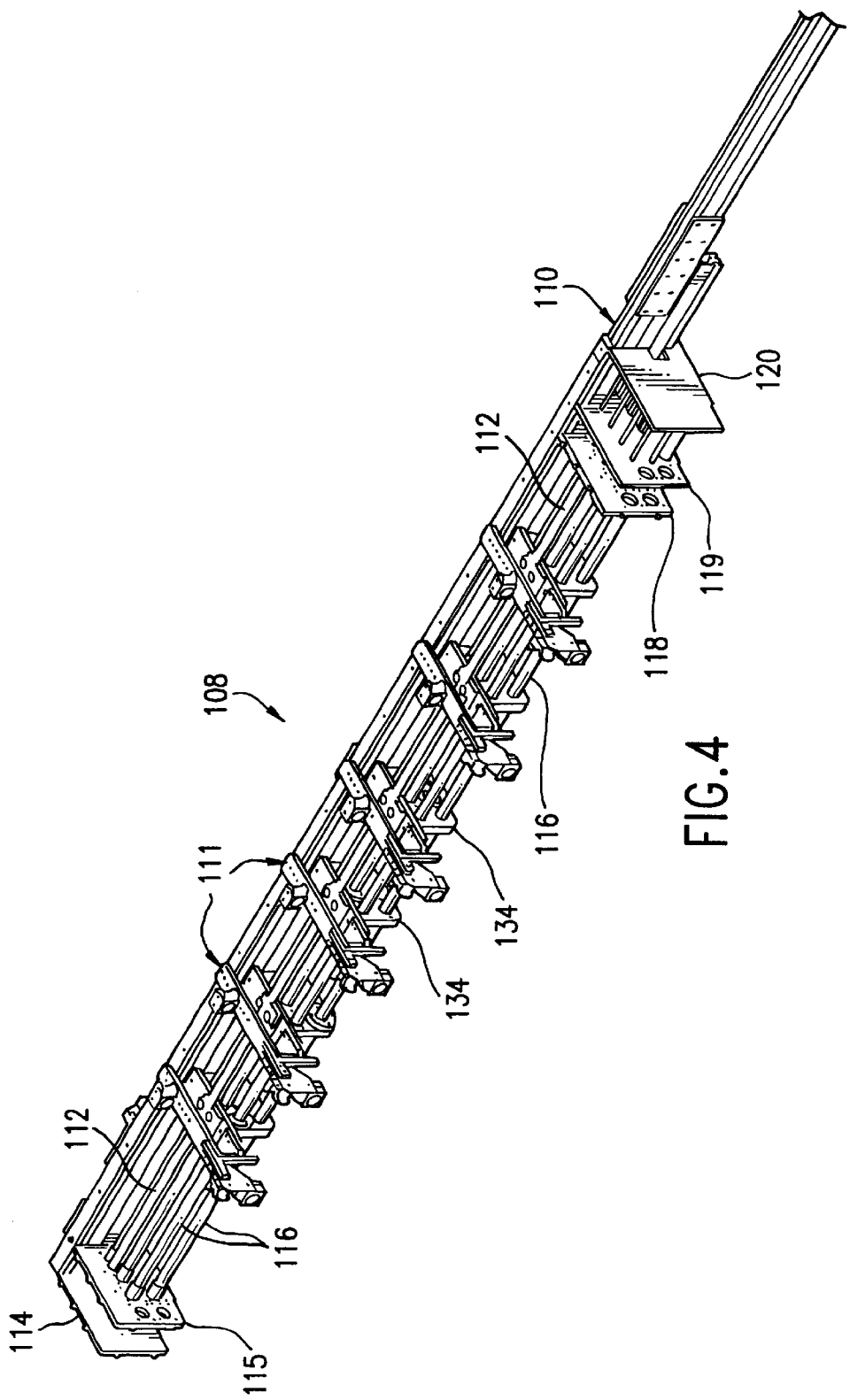
FIG. 4 is a perspective view of a part of the apparatus frame, with the top plate removed to show the interior parts in greater detail.
Figure 5:
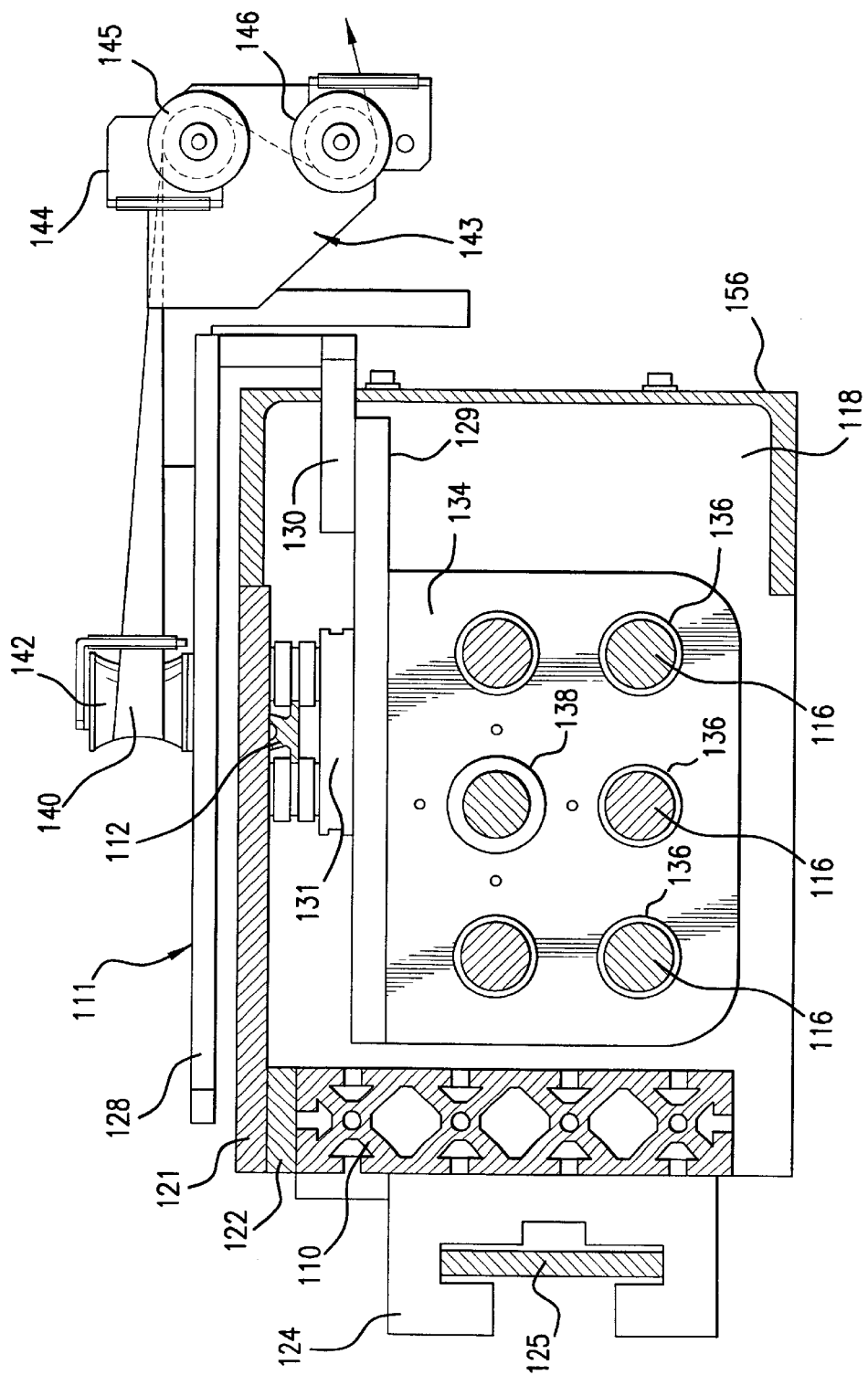
FIG. 5 is a detailed cross-sectional view of the apparatus showing the beam on the support beam of the web handling machine and of the apparatus with a tape dispensing guide arm.
Figure 6:
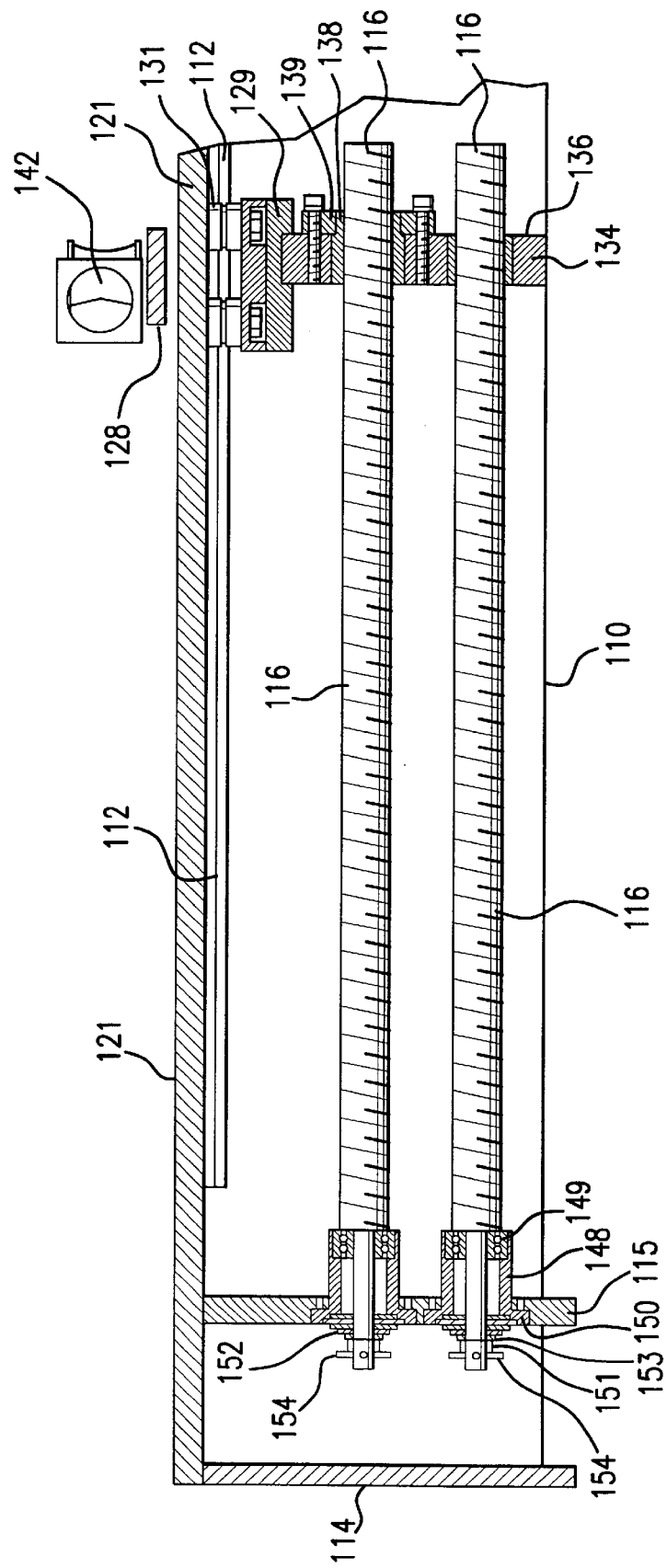
FIG. 6 is a detailed longitudinal sectional view of the tape dispensing apparatus.
Figure 7:
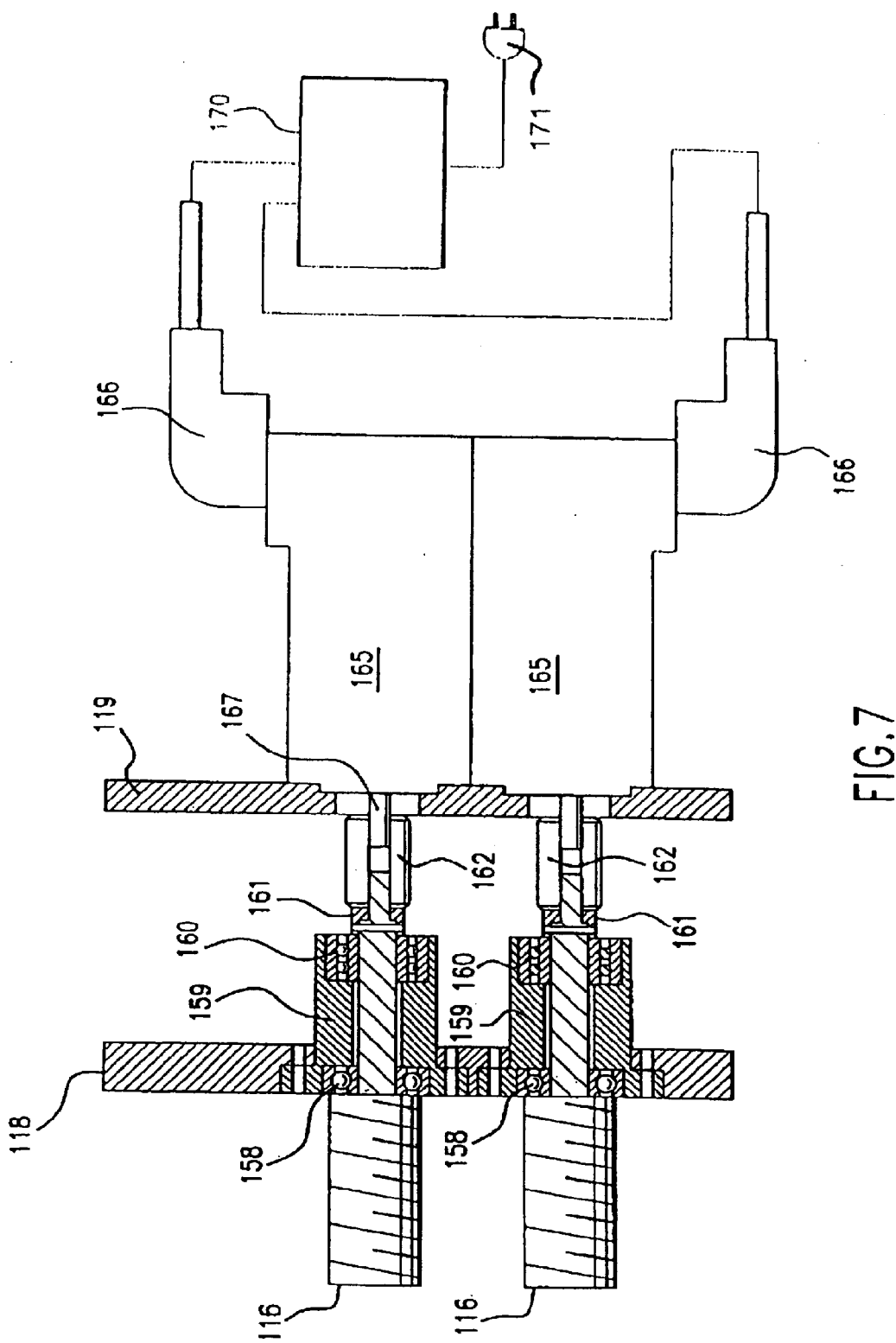
FIG. 7 is a further longitudinal sectional view showing the drive connection of the apparatus.

FIG. 4 illustrates an apparatus 108 (with the top cover plate removed) for remotely positioning spaced operating units (e.g., guide arms). The apparatus 108 includes a main beam 110, which supports six of the tape dispensing guide arms 111 (any number of guide arms could be used). The main beam 110 of the apparatus 108 is an extruded part, which can be metal or a composite, preferably made of aluminum. Extending parallel or substantially parallel to the main beam 110 is a bearing rail 112 to support the guide arms 111, as will be further described. There is an end plate 114, and a bearing plate 115 that supports the ends of a plurality of threaded lead rods 116 (which could be threaded lead screws), and at the other end of the main beam 110 is a bearing mount plate 118 and a motor mount plate 119.

Referring to FIGS. 4–7, secured to the top plate 121 is the bearing rail 112. The main beam 110 supports track roller brackets 124, which support the apparatus 108 on a track 125, which is supported by the frame of the web handling machine. The guide arm 111 includes an exterior final guide plate 128 connected to a bearing mount plate 129 by a mounting plate structure 130. A bearing mounting assembly 131, supported by the bearing mount plate 129, supports a given guide arm 111 from the bearing rail 112. Supported by the bearing mount plate 129, opposite the bearing mounting assembly 131, is the support plate 134 through which extend the threaded rods 116. The support plate 134 includes a series of holes having support bushings 136. The multiple threaded rods 116 pass through the holes and are supported by the bushings 136. In one of the holes in the support plate 134 is a threaded nut 138 mounted on the support plate 134 by a mounting flange 139 such that rotation of the threaded rod 116 engaging the threaded nut 138 will move the threaded rod support plate 134. This movement moves the support plate 134 along the rail 112 and the guide arm 111 along the main beam 110. It is this movement that controls the position of a given tape dispensing guide arm.

The guide arm 111 includes the series of rollers for directing the tape 140, including the entry pulley assembly 142 and an exit pulley assembly 143, the latter including a spacer plate 144, and pulleys 145 and 146 directing the tape 140 toward the web path.

The threaded rods 116 have ACME threads and are rotatable in opposite directions to move the tape dispensing units to the desired positions. The ends of the rods 116 terminate in self-aligning bearing blocks 148 and bearings 149. The plate 115 supports the thrust bearing 150. The rods 116 have a castellated nut 151, a washer 152, which is preferably a rubber washer, and a washer 153 on the reduced end of the rods 116, as shown, secured by a cotter pin 154. The threaded rods 116 are journalled in the plate 118 by a single ball bearing 158 mounted in a bearing block 159, which also supports a double row ball bearing assembly 160. Connected at the drive end of the rods 116 is a shaft end stop 161 and a flexible coupling 162.

A flexible coupling 162 connects a given threaded rod 116 to a corresponding servo motor 165 with an attached gear head (not shown) having a drive shaft 167 joined to the flexible couplings 162. There is one servo motor 165 for each threaded rod 116, e.g., in the illustrated apparatus there would be six motors 165. Each servo motor 165 is connected to an operating computer 170 and an external power source 171. The apparatus 108 could have any number of rods and/or motors, depending on the number of operating units used. All rods are positioned in a parallel or substantially parallel relationship. More motors than rods could be present for backup purposes.

In the illustrative embodiment, the control system 2 includes a controller, e.g., a microcontroller, e.g., a programmable logic controller (PLC), particularly the Allen-Bradley model SLC 5/04 PLC with power supply, Allen Bradley 1746-BAS basic module, and Allen Bradley PanelView 600 Color/Touchscreen operator interface, all available from Rockwell Automation, 1 Allen-Bradley Drive, Mayfield Heights, Ohio 44124-6118, U.S.A. Suitable servos are available from Quicksilver Controls, Inc. 712 Arrow Grand Circle, Covina, Calif. 91722, U.S.A., such as their Quicksilver Control QCI-23H-5 servos. Other control systems could include a computer other than a PLC including, e.g., an industrial computer system.

The control system 2 transmits information to the servo motors, resulting in the movement of the tape dispensing guide arms. The operator determines a desired tape position on the web, and then inputs these values into the operator interface, which can be in the form of an interactive screen on a display. Once all of the guide arm positions have been entered, the controller calculates the move distance for each guide arm, and transmits these values to the servo motors. The threaded rods start spinning as the servo motors are actuated, causing the tape guide arms to move. When a given guide arm reaches the predetermined location, the servo motor stops. In some instances, the computer may transmit a zero-move distance to one or more of the servo motors while transmitting non-zero move distances to other servo motors. In these instances, the servo motor or servo motors receiving a "no move" or "zero distance" signal will not move at all.

The control system 2 may be programmed using a ladder-logic programming language, particularly the RSLogix 500 software of Allen-Bradley. Once the program is created, it is downloaded into the PLC. Details of appropriate program code may vary based upon the application, and will become apparent to one skilled in the art upon reference to this specification. The steps involved with the novel processes of the present invention may alternatively be embodied in software that is executed by a general-purpose computer or other logic device. For such software implementations, the reader will understand that the invention can thus take the form of a computer program product that may be embodied in a computer-readable medium, including storage media, or transmission media.

Figure 8:
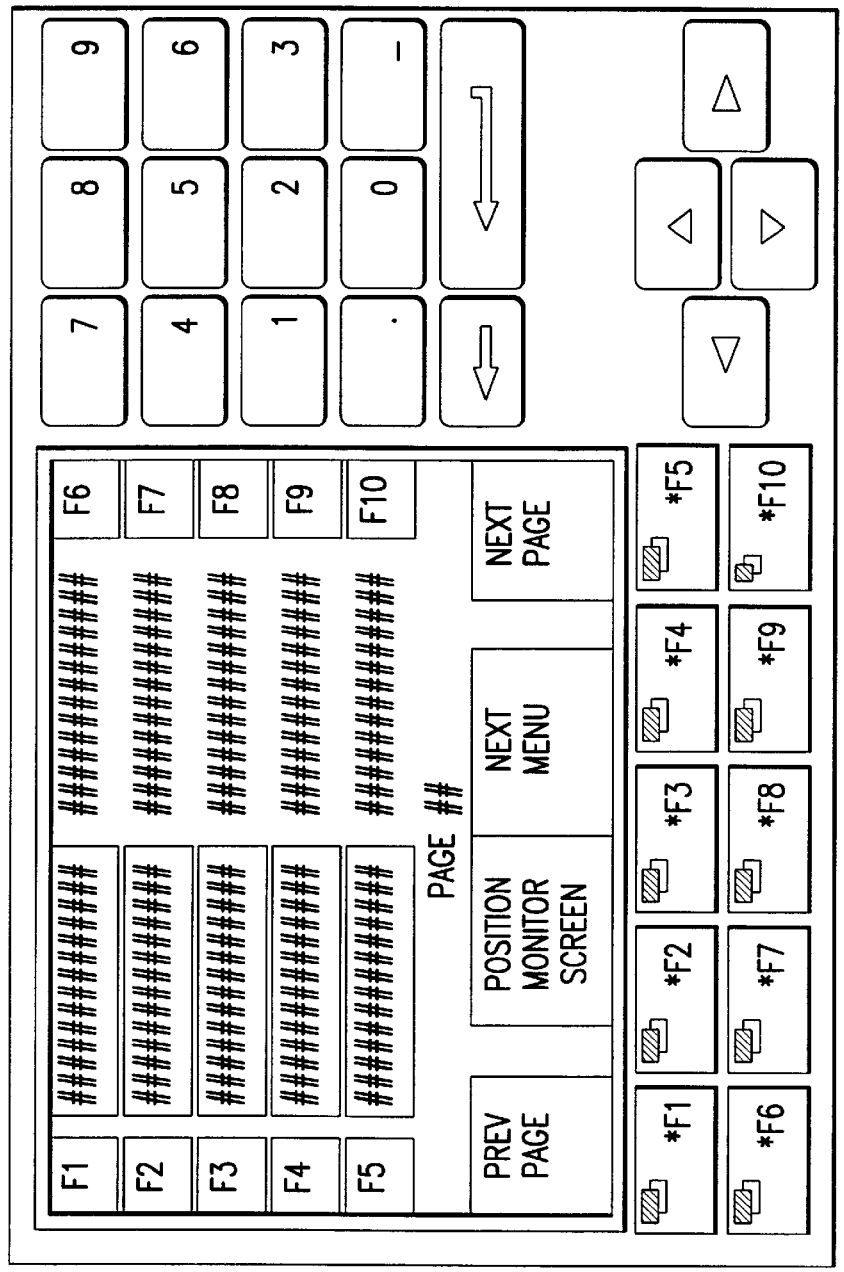
FIG. 8 is a plan view of one embodiment of a user interface screen used in conjunction with the strip fabrication assembly of FIG. 2, for entering or recalling customer orders (e.g., guide arm specifications)

FIG. 8 illustrates an operator interface 4 in the form of an order listing screen 30 that is constructed in accordance with the present invention. This interface is used for customer recipe/order management, by allowing the operator to enter predetermined tape setups (e.g., guide arm positions), and save those setups for later use. After the tape setups have been saved to the PLC memory they will be listed on the order listing screen. The orders will be displayed in the first open memory position. To select an order number the operator pushes the corresponding function key next to the order number to be recalled. If there are more than 10 order numbers in memory, the operator will push the next page button and be taken to the next 10 order numbers in memory. The page number will be displayed on the bottom of the screen.

Figure 9:
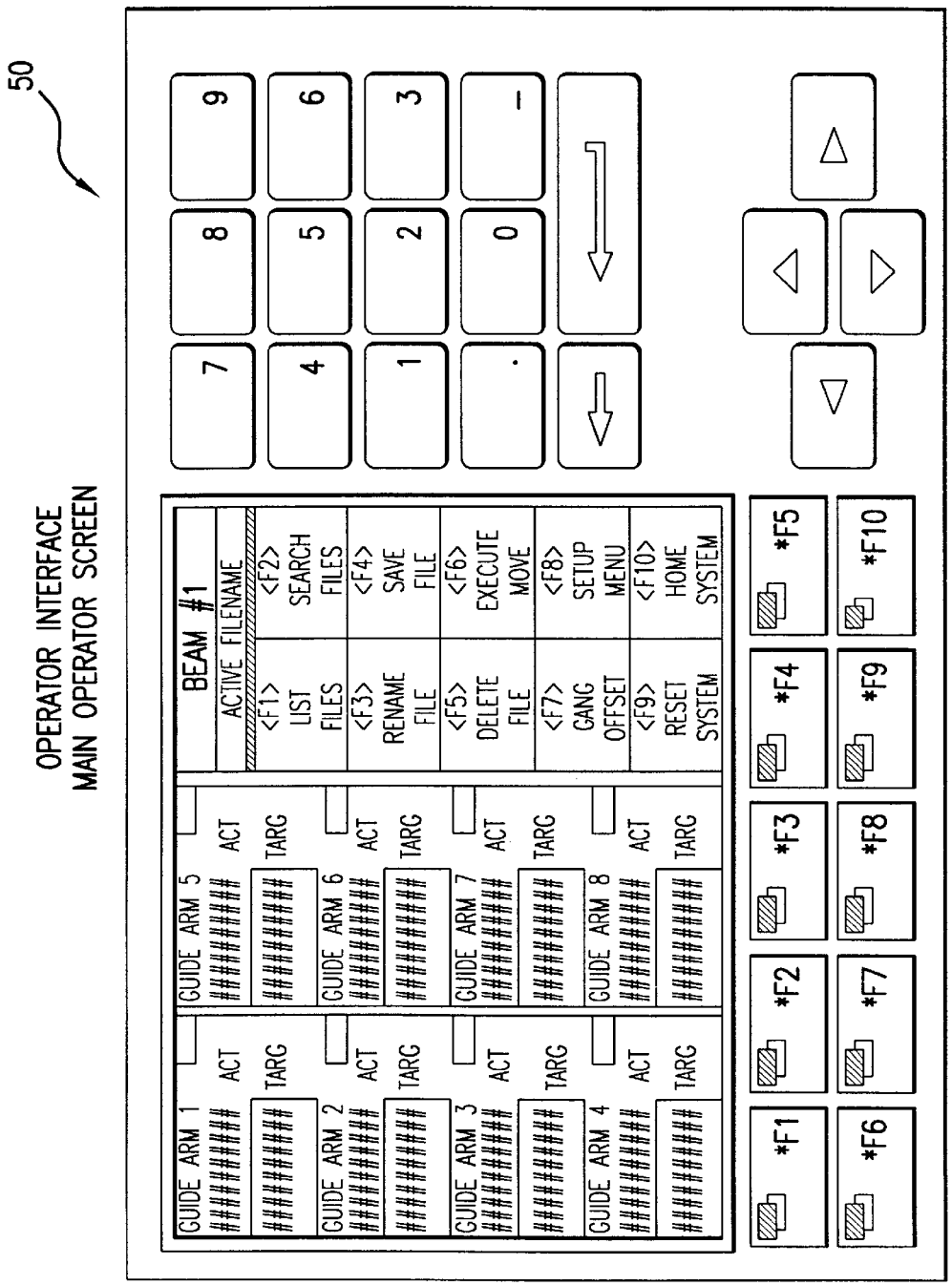
FIG. 9 is a plan view of one embodiment of another user interface screen used in conjunction with the strip fabrication assembly of FIG. 2, for carrying out orders that have been previously entered via the order listing screen of FIG. 8.

FIG. 9 illustrates a main operator screen 50 that is further used in accordance with the present invention to carry out previous orders that have been entered via order listing screen 30. After the operator selects an order, the previously entered arm positions will be displayed in the appropriate locations. The position that was previously entered will be shown in the box that has the TARG label next to it. The actual position of the guide arm will be shown in a field directly above the TARG box. The current active filename will be listed in the upper right hand corner of the screen. When the operator wants to move the arms into position, the operator will push the F6 button and the arms will start moving. The GANG OFFSET button will automatically move all of the guide arms by an entered value. If the operator wants to change the arm position for one guide arm, the operator will touch the box of the appropriate arm number. The operator will be prompted to enter a new number, using the keypad on the right of the operator interface, and then the new value will be displayed in the appropriate box. The operator will then push the F6 button to get the arm to move.

Figure 10:
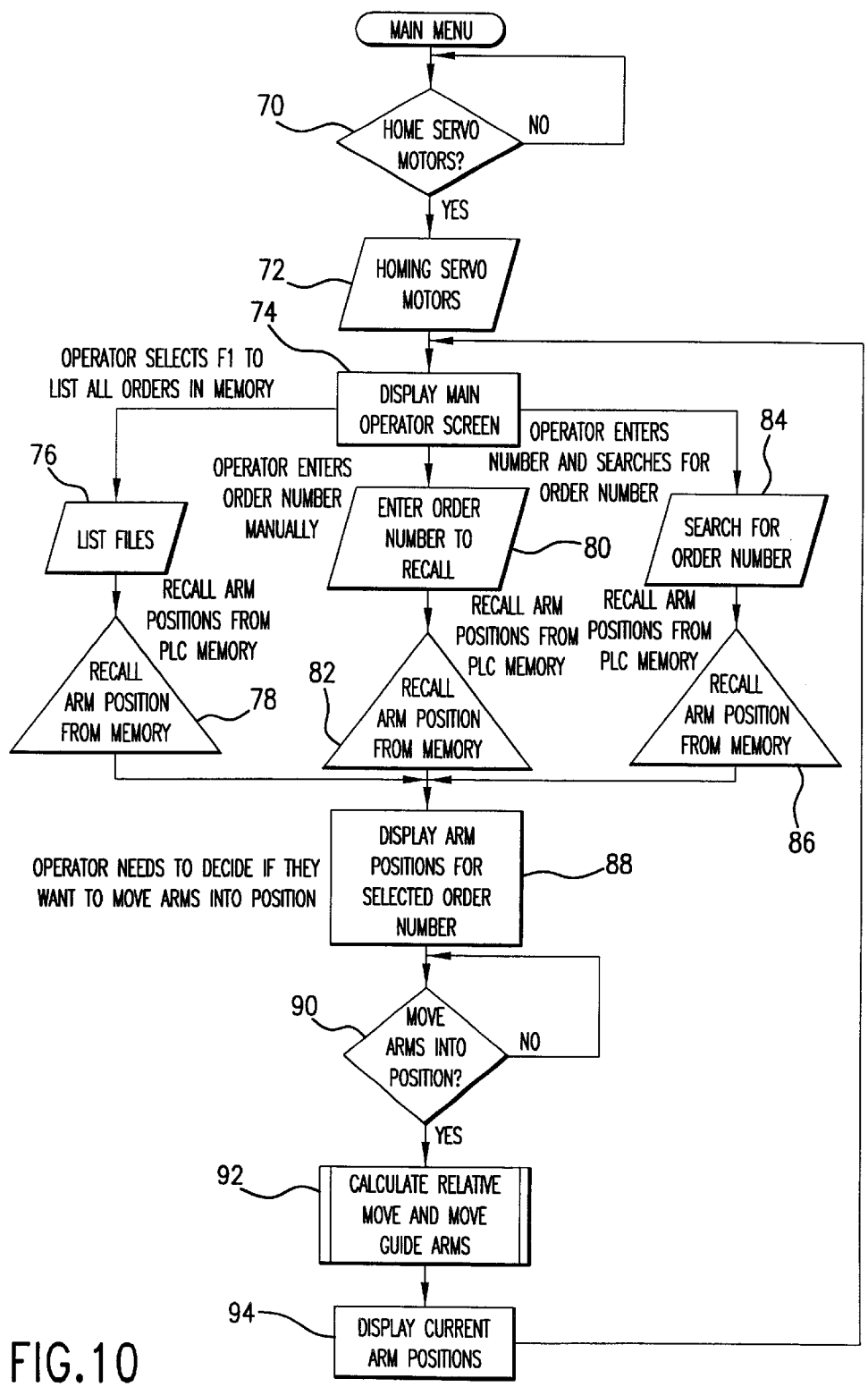
FIG. 10 is a flow diagram illustrating the logical flow for carrying out an illustrative embodiment of the present invention.

The invention may be further understood with reference to the flow chart of FIG. 10. The process begins with the controller determining whether all of the servo motors are homed (70), i.e., determining whether the servo motors are properly positioned to ensure proper calibration, and then homing any servo motors as required (72). The controller then displays the main operator screen 30 on the display device of the system (74). If the operator selects the F1 button on the touch-sensitive display screen, all orders in memory are listed (76). When one of the orders is selected, the corresponding arm positions are recalled from the PLC memory (78). If the operator instead desires to enter the order number manually (80), then the order is recalled and the arm positions are loaded from memory (82). Alternatively, the operator may search for an order number (84), and retrieve the order number. The act of retrieving the corresponding order will cause the arm positions to be recalled from the PLC memory (86).

The system preferably displays the arm positions, which allows the operator to determine if they appear correct for the selected order number (88). The operator then decides whether to move the arms into position (90). Alternately, the operator could be queried as to whether to move the arms into position (90). If the operator decides to move the guide arms into position, the relative move of the servo motors is calculated and the guide arms are moved (92). Current guide arm positions are displayed during operation of the strip fabrication assembly (94). The process may then continue in an iterative fashion, returning to step 74, to allow the operator to enter or select a different order. In this manner, when the latter order is effectuated by moving the guide arms to different positions (in step 92), this switchover to a different order may be completed on-the-fly, that is, without interruption of the actual fabrication process.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of an assembly for dispensing corrugated sheeting, it is applicable to other web-type handling machinery such as web-slitting knives, strip-coating units, or tape applicators. It is therefore contemplated that such modifications can be made without departing from the spirit or scope of the present invention as defined in the appended claims.

Figure 11:
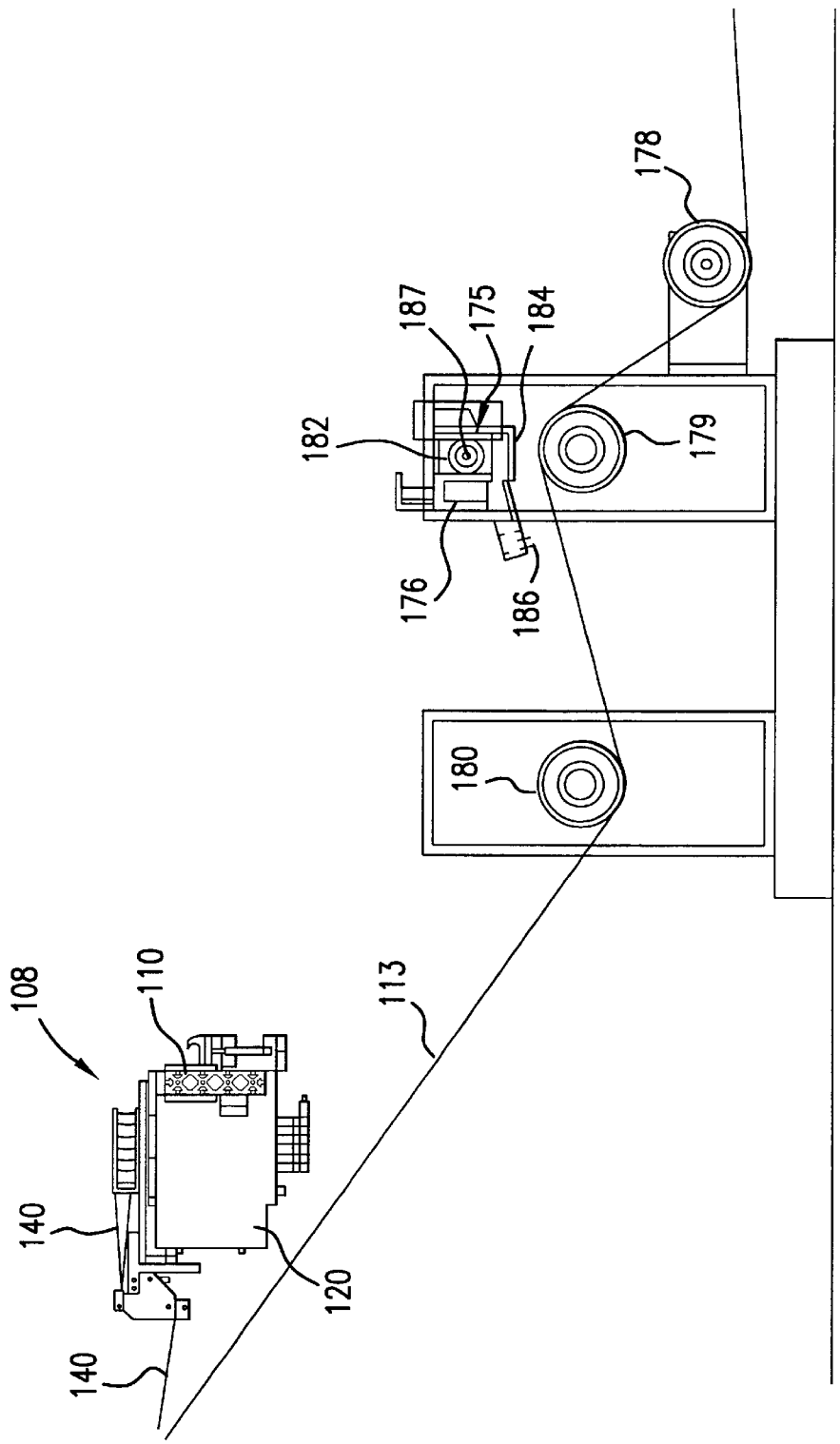
FIG. 11 is a side view of the web traveling through a machine and past a web tracking system and toward the tape dispensing unit.
Figures 12A, 12B:
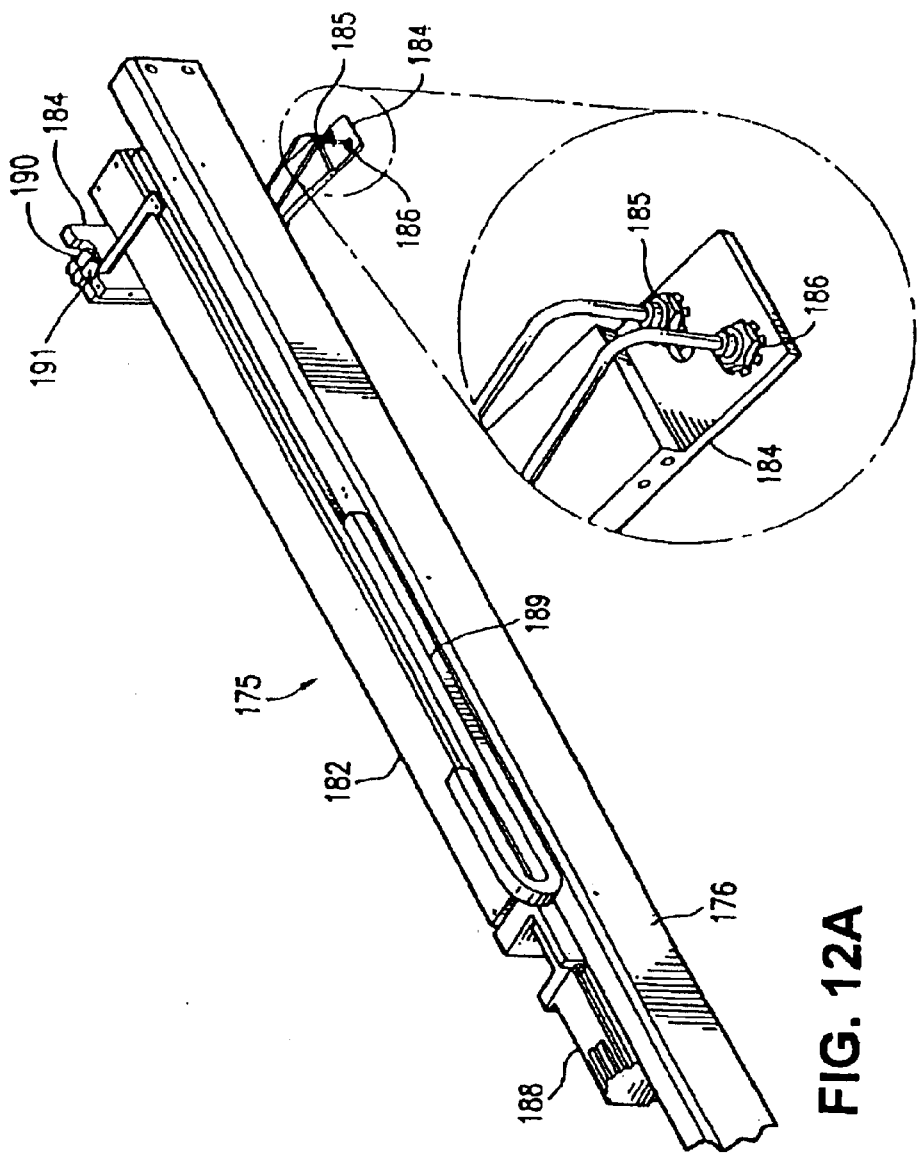
FIG. 12A is a detail view of the sensor and support structure of the web tracking system of FIG. 11.
FIG. 12B is an enlarged view of the sensor.

In one embodiment, for example, the system for positioning guide members is used in conjunction with a web tracking unit. Referring to FIGS. 11, 12A and 12B, a web tracking unit 175 is used to track the position of a web 113 as it moves right or left from the normal web path or position. The web tracking unit 175 is also used to maintain the position of the guide arms 111 in relation to the web 113. The web tracking unit 175 is placed up stream from the positioning apparatus 108 on a beam 176 of the frame of the web handling machine. The web handling machine supports spaced web guiding rollers 178, 179 and 180. As the web 113 passes the roller 179, the web tracking unit 175 looks at the position of the web 113. The web tracking unit 175 includer a linear slide 182, supporting an arm 184 that supports a pair of sensors 185 and 186 that are spaced transversely or substantially transversely of the normal web path and that are spaced in the direction of movement of the web 113. The arm 184 is moved along the linear slide 182 by a servo motor 188. The linear slide 182 is supported from the beam 176, which also supports a cable track 189, which supports electrical cables (not shown). The servo motor 188 is coupled to a threaded rod 187 in the linear slide 182 and the threaded rod is connected to the arm 184. As formed, one spin of the threaded rod clockwise or counterclockwise moves the arm 184 10 millimeters and the encoder of the servo motor takes 4000 counts per revolution to precisely tell the position of the arm 184.

Referring now to FIGS. 12A, 12B and 13, the sensors 185 and 186 are formed of optical fibers. A laser light travels through each fiber and exits toward the web 113 on one side thereof Light is reflected from the web 113 back to the fiber and is received by light receivers and sensor amplifiers 190 and 191, respectively. The sensors 185 and 186 have a built in alternating light source to avoid interference, or avoid one fiber from receiving reflected light from the other fiber. Again, each fiber is an emitter and receiver. The amplifiers 190 and 191 generate signals to the PLC of the positioning apparatus 108, which sends signals to the servo motor 188 to move the sensors, and then move the guide arms 111.

Figure 13A:
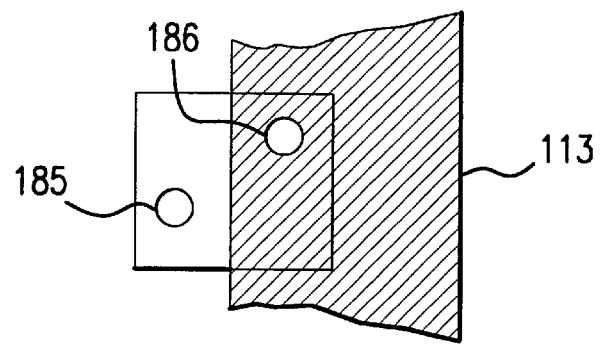
FIGS. 13A–C are diagrammatic views of the sensors tracking the edge of a web.
Figure 13B:
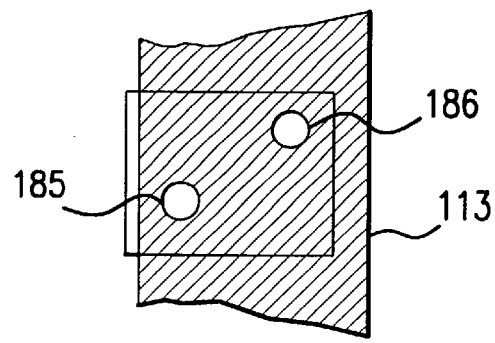
Figure 13C:
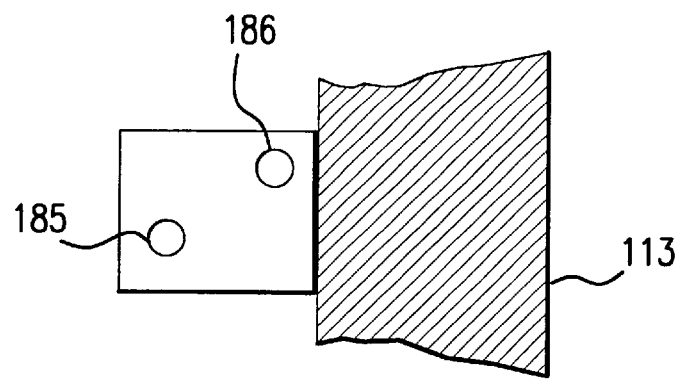
Figure 14:
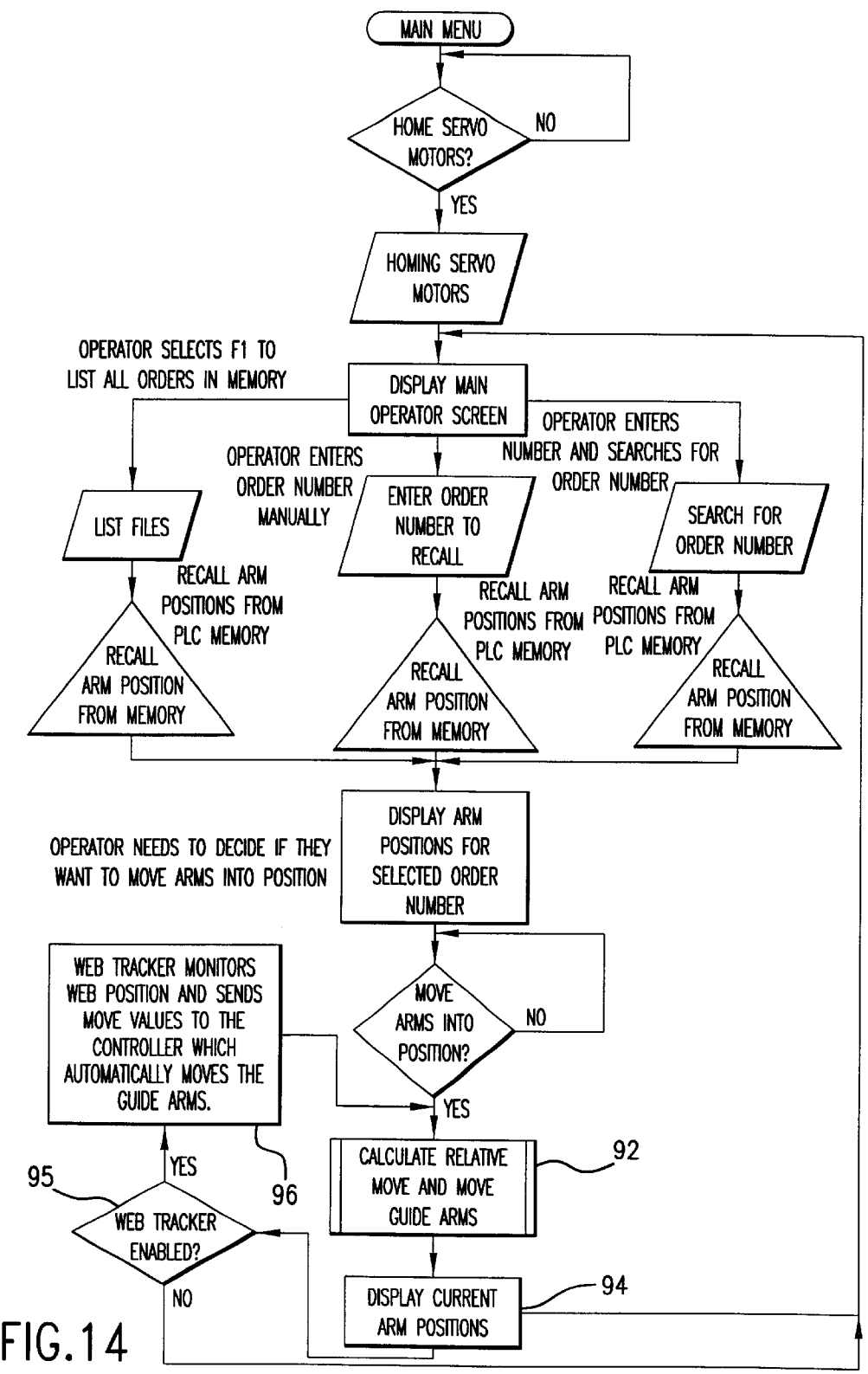
FIG. 14 is a flow diagram illustrating the logical flow for carrying out a second illustrative embodiment of the invention.

Referring now to FIGS. 13A–C, which diagrammatically illustrate the operation of the sensors, the illustration 13A indicates the sensors 185 and 186 tracking the web 113 in the "normal position." Sensor 186 will receive a reflection and output a "1" and sensor 185 will no reflection and output a "0." This "1" and "0" will provide an indication that the web is in the normal position or deadband range (i.e., the area between the two sensors within which a movement of the web is not detected). If the web 113 moves to the position illustrated at 13B, the sensor 186 will output a "1" and the sensor 185 will output a "1" as well. In this position, the web tracking device will sense the web 113 has moved to the left. Under this condition the arm 184 will be moved to the left to re-center the sensors to achieve the position shown in 13A above. If the web 113 moves to the right, the condition shown in illustration 13C may exist. In this position, the sensor 186 will output a "0" and the sensor 185 will output a "0". Under this condition, the PLC will know the web has moved to the right and it will start a move to re-center the sensors by moving the sensors to the right to achieve the condition illustrated in 13A. Movement of the sensor arm 184 will be measured to also cause the PLC to signal the servo motors 165 to move all the guide arms 111 to the left or to the right simultaneously, an equivalent amount to maintain the position of the tapes on the web 113 in the desired position. The linear slide 182 was obtained from NSK Corporation, of Cerritos, Calif., U.S.A. as part number MCM08070H10-000A and the fiber optic sensors and amplifiers were acquired from SICK, Inc., of Minneapolis, Minn. The part number for the fiber optic cable is LL3-DB01 and the amplifier is part No. WLL170T-F420 and with the alternate frequency light model, WLL170T-F430.

The signals from the receivers and amplifiers indicate movement of the web from the normal position, and the sensors are then moved to obtain the deadband position for the sensors, i.e., a sensor positioned on each side of the web edge.

Referring to FIGS. 1, 8, 9 and 14, the operator interface 4 can include an additional button to enable or disable the web tracking unit 175. When the web tracking unit 175 is enabled (95), the web tracking unit 175 goes out across the web 113 to find the edge of the web 113 (96). When the edge of the web 113 is found, the servo motor 188 registers the distance the web tracking unit 175 has moved and relays the information back to the control system 2 (92). The control system 2 then conducts a series of calculations (92) and sends a signal (92) that causes the guide arms 111 (92) to move a distance that reflects the change in the web position.

The guide arms 111 maintain a predetermined distance from the edge of the web 113, the distance having been predetermined according to an operator input. When the web tracking unit 175 is in the enabled mode, the web tracking unit 175 constantly monitors the position of the edge of the web 113 (96). If the position of the edge of the web 113 changes, the web tracking unit 175 conveys this information to the control system 2, which then moves the guide arms 111 (92) to a new position according to the change in the position of the web edge. The current guide arm positions are then displayed on the monitor (94).

Other embodiments are within the claims.

What is claimed is:

1. A method of dispensing a strip product, said method comprising:
    entering a plurality of guide arm positions for corresponding guide arms of a strip fabrication assembly, into a guide arm controller device, wherein the guide arms align a plurality of moving strip materials;
    automatically moving the corresponding guide arms of the strip fabrication assembly to the respective guide arm positions using the guide arm controller device; and
    feeding at least one strip material through the strip fabrication assembly using the guide arms.

2. The method of claim 1 wherein each of the guide arms is coupled to a respective one of a plurality of threaded rods, and said moving step includes the step of actuating a plurality of motors which are respectively coupled to the threaded rods.

3. The method of claim 2 wherein the guide arm controller device includes a programmable logic controller, and further comprising the step of programming the controller to control the motors in response to entry of the guide arm positions.

4. The method of claim 1 wherein said entering step includes the step of:
    listing a plurality of sets of previously entered guide arm positions on a display device of the guide arm controller device; and
    selecting one of the previously entered sets of arm positions as a current set of arm positions, using an input interface of the guide arm controller device.

5. The method of claim 1 wherein said entering step includes the steps of:
    searching for an order number associated with one of a plurality of sets of previously entered guide arm positions; and
    selecting one of the previously entered sets of guide arm positions as a current set of arm positions, using an input interface of the guide arm controller device.

6. The method of claim 1 wherein the plurality of guide arm positions is a first plurality of guide arm positions, and the integrated strip product is a first integrated strip product, further comprising the step of:
    entering a second plurality of guide arm positions into the guide arm controller device;
    automatically moving the corresponding guide arms of the strip fabrication assembly to the respective ones of the second plurality of arm positions using the guide arm controller device; and
    feeding at least one strip material through the strip fabrication assembly using the guide arms.

7. The method of claim 6 wherein the guide arm controller device includes a programmable logic controller, and further comprising the step of programming the controller to allow for the entry and retention of multiple sets of arm positions corresponding to different strip product orders.

8. The method of claim 1, wherein the guide arm controller device generates a guide arm position signal and the guide arm controller device automatically moves the guide arms in response to the guide arm position signal without interrupting the strip product dispensing method.

9. An apparatus for controlling a guide arm system of a strip fabrication assembly, comprising:
    a display device;
    a user input device;
    a plurality of guide arms;
    a plurality of servo motors that are coupled respectively to the guide arms; and
    a microcontroller connected to said display device and said user input device, said microcontroller having means for receiving a plurality of guide arm positions for corresponding guide arms which are entered into said user input device, and means for transmitting control signals to the plurality of servo motors, to thereby move the guide arms based on the plurality of arm positions.

10. The apparatus of claim 9 wherein said microcontroller is a programmable logic controller.

11. The apparatus of claim 9, wherein said display device and said user input device comprise a single device.

12. The apparatus of claim 9 wherein said microcontroller further has means for listing a plurality of sets of previously entered arm positions on said display device, and means for selecting one of the previously entered sets of arm positions as a current set of arm positions in response to said user input device.

13. The apparatus of claim 8 wherein said microcontroller further has means for searching for an order number associated with one of a plurality of sets of previously entered arm positions, and means for selecting one of the previously entered sets of arm positions as a current set of arm positions, using said user input device.

14. The apparatus of claim 9 wherein said microcontroller further has means for allowing the entry and retention of multiple sets of arm positions corresponding to different strip product orders.

15. A computer program product comprising:
    a computer-readable storage medium; and
    program instructions stored on said storage medium for controlling a guide arm system of a strip fabrication assembly, including program instructions for receiving a plurality of guide arm positions for corresponding guide arms, and program instructions for transmitting control signals to a plurality of motors which are coupled respectively to the guide arms, to thereby move the guide arms based on the plurality of arm positions.

16. The computer program product of claim 15 wherein said program instructions further provide a listing of a plurality of sets of previously entered guide arm positions, and allow a user to select one of the previously entered sets of guide arm positions as a current set of guide arm positions.

17. The computer program product of claim 15 wherein said program instructions further search for an order number associated with one of a plurality of sets of previously entered guide arm positions, and allow a user to select one of the previously entered sets of guide arm positions as a current set of guide arm positions.

18. The computer program product of claim 15 wherein said program instructions further allow the entry and retention of multiple sets of arm positions corresponding to different strip product orders.

19. A strip fabrication assembly comprising:
   a plurality of feed rollers, positioned to integrate strip materials into a strip product;
   a plurality of guide members located proximate said rollers, wherein said guide members are capable of aligning the strip materials;
   a user input device capable of receiving and recording input for a predetermined respective position for each respective guide member; and
   means for automatically adjusting each position of each guide member in response to guide member position input transmitted from the user input device.

20. The strip fabrication assembly of claim 19, wherein said user input device allows the entry and retention of multiple sets of arm positions corresponding to different strip product orders.

21. The strip fabrication assembly of claim 19, wherein said automatic adjusting means includes at least one motor coupled to said guide members.

22. The strip fabrication assembly of claim 19 wherein the guide members are tape dispensing arms.

23. A strip fabrication assembly comprising:
   a plurality of feed rollers, positioned to integrate strip materials into a strip product;
   a plurality of guide members located proximate said rollers, wherein said guide members are capable of aligning the strip materials; and
   means for controlling the positions of said guide members, wherein said controlling means includes a plurality of motors coupled respectively to said guide members.

24. The strip fabrication assembly of claim 23 wherein said controlling means receives a plurality of arm positions for corresponding guide arms, and transmits control signals to said motors to thereby move the guide arms based on the plurality of arm positions.

25. The strip fabrication assembly of claim 23 wherein said controlling means lists a plurality of sets of previously entered arm positions on a display device, and selects one of the previously entered sets of arm positions as a current set of arm positions in response to a user input device.

26. The strip fabrication assembly of claim 23 wherein said controlling means searches for an order number associated with one of a plurality of sets of previously entered arm positions, and selects one of the previously entered sets of arm positions as a current set of arm positions in response to a user input device.

27. The strip fabrication assembly of claim 23 wherein said controlling means allows the entry and retention of multiple sets of arm positions corresponding to different strip product orders.

\* \* \* \* \*

UNITED STATES PATENT AND TRADEMARK OFFICE
CERTIFICATE OF CORRECTION

PATENT NO. : 6,705,500 B2
DATED : March 16, 2004
INVENTOR(S) : Shea et al.

It is certified that error appears in the above-identified patent and that said Letters Patent is hereby corrected as shown below:

Title page,
Item [56], References Cited, U.S. PATENT DOCUMENTS, please add the following reference:
-- 2002/0139470 A1    10/2002    Robitaille et al. --

Signed and Sealed this

Fifteenth Day of June, 2004

JON W. DUDAS
*Acting Director of the United States Patent and Trademark Office*